United States Patent
Tastekin et al.

(10) Patent No.: US 11,097,615 B2
(45) Date of Patent: Aug. 24, 2021

(54) DASHBOARD UNIT AND COVER-PANEL

(71) Applicant: TOYOTA MOTOR EUROPE, Brussels (BE)

(72) Inventors: Ozgur Tastekin, Brussels (BE); Benoit Herbin, Brussels (BE); Wim Smets, Brussels (BE); Daniel Jones, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 92 days.

(21) Appl. No.: 16/316,828

(22) PCT Filed: Feb. 6, 2017

(86) PCT No.: PCT/EP2017/052569
§ 371 (c)(1),
(2) Date: Jan. 10, 2019

(87) PCT Pub. No.: WO2018/141417
PCT Pub. Date: Aug. 9, 2018

(65) Prior Publication Data
US 2019/0299785 A1    Oct. 3, 2019

(51) Int. Cl.
*B60K 35/00* (2006.01)
*B60K 37/06* (2006.01)
*B60R 11/02* (2006.01)
*B60K 37/04* (2006.01)

(52) U.S. Cl.
CPC ............. *B60K 35/00* (2013.01); *B60K 37/04* (2013.01); *B60K 37/06* (2013.01);
(Continued)

(58) Field of Classification Search
CPC ........ B60K 35/00; B60K 37/04; B60K 37/06; B60K 2370/91; B60K 2370/157;
(Continued)

(56) References Cited

U.S. PATENT DOCUMENTS

| | | | | |
|---|---|---|---|---|
| 6,158,802 A * | 12/2000 | Akagi | ................... | B60Q 1/0076 200/296 |
| 7,733,659 B2 * | 6/2010 | Snider | ................... | H05K 9/0047 361/752 |
| 8,523,117 B2 * | 9/2013 | Hirota | ................... | H05K 7/1405 248/27.1 |
| 9,237,685 B2 * | 1/2016 | Snider | ..................... | G04R 20/10 |
| 9,715,841 B2 * | 7/2017 | Hori | ........................ | B60K 35/00 |

(Continued)

FOREIGN PATENT DOCUMENTS

DE    10 2010 005 485 A1    7/2011

OTHER PUBLICATIONS

Oct. 16, 2017 International Search Report issued in International Patent Application No. PCT/EP2017/052569.

*Primary Examiner* — Muhammad Ijaz
(74) *Attorney, Agent, or Firm* — Oliff PLC

(57) ABSTRACT

A dashboard component assembly for a vehicle, including: a cover-panel; a main body and an auxiliary body, the auxiliary body being retained on the main body so as to be movable in at least one dimension relative to the main body prior to installation of the cover-panel, the cover-panel is configured to cover at least a portion of each of the main body and the auxiliary body; a primary datum included by one of the cover-panel or the main body; a primary datum retainer included by the other of the cover-panel or the main body, the primary datum is configured to engage at least one primary datum retainer to cause a predetermined alignment of the cover-panel with regard to the main body; a secondary datum included by one of the cover-panel or the auxiliary body; a secondary datum receiver comprised by the other of the cover-panel or the auxiliary body.

19 Claims, 7 Drawing Sheets

(52) U.S. Cl.
CPC .... *B60R 11/0235* (2013.01); *B60K 2370/126* (2019.05); *B60K 2370/1438* (2019.05); *B60K 2370/157* (2019.05); *B60K 2370/164* (2019.05); *B60K 2370/688* (2019.05); *B60K 2370/691* (2019.05); *B60K 2370/693* (2019.05); *B60K 2370/81* (2019.05); *B60K 2370/816* (2019.05); *B60K 2370/822* (2019.05); *B60K 2370/84* (2019.05); *B60K 2370/91* (2019.05)

(58) Field of Classification Search
CPC .......... B60K 2370/822; B60K 2370/81; B60K 2370/693; B60K 2370/688; B60K 2370/816; B60K 2370/84; B60K 2370/691; B60K 2370/126; B60K 2370/164; B60K 2370/1438; B60R 11/0235
USPC ................................................ 248/27.1, 27.3
See application file for complete search history.

(56) References Cited

U.S. PATENT DOCUMENTS

| | | | |
|---|---|---|---|
| 2004/0095529 A1* | 5/2004 | Snider | B60K 35/00 349/113 |
| 2010/0085494 A1* | 4/2010 | Shimizu | B60K 35/00 348/837 |
| 2011/0182032 A1 | 7/2011 | Pandura et al. | |
| 2014/0292013 A1 | 10/2014 | Colombo et al. | |
| 2016/0200263 A1 | 7/2016 | An et al. | |

* cited by examiner

DASHBOARD UNIT AND COVER-PANEL

FIELD OF THE DISCLOSURE

The present disclosure is related to dashboard components of a vehicle, and more particularly to a dashboard unit and cover-panel having reduced joint tolerances while facilitating installation.

BACKGROUND OF THE DISCLOSURE

As consumers become more demanding with regard to the fit and finish quality of a vehicle interior, manufacturers have sought to improve the look and feel of interior components to meet consumers' expectations.

One example of an area in which quality perception can be improved is joint tolerances and overall aesthetic appeal of dashboard components. Because the dashboard is a user's primary interface to the vehicle being operated, a user may be influenced by the quality appearance of this portion of the vehicle.

As one of skill understands, the dashboard of a vehicle comprises many components, for example, gauges, vents, entertainment systems (e.g., one or more radios), among others. Each of these components generally includes one or more parts configured to cause the component to appear as seamless as possible with regard to the surrounding dashboard materials.

US 2011/0182032 discloses a support part that is arranged in an instrument panel of a motor vehicle to hold a vehicle data display unit, the unit having an integrated navigation or radio unit. The support part has a single-piece frame composed of a magnesium pressure die cast material with a central holding frame for the unit and lateral holding frames for the air outlets. The support part is connected at one side to the instrument panel and another side to the cockpit cross member. Centering receptacles for the unit and further centering receptacles for the air outlets are arranged in the central holding frame and in the two lateral holding frames. Centering elements are arranged on the unit and on the air outlet correspondingly to the centering receptacles of the holding frames.

SUMMARY OF THE DISCLOSURE

The inventors of the present disclosure have recognized that the configurations described above generally result in the appearance of separation lines between components present on the dashboard. Further, the joint tolerances of components integrated on each unit of the existing art remain relatively large, possibly resulting in an impression of lower quality.

Therefore, the present inventors have sought to improve the existing components and covering members so as to improve the impression of quality for a user.

According to embodiments of the present disclosure, a dashboard component assembly for a vehicle is provided. The assembly comprises, a cover-panel, a main body and an auxiliary body, the auxiliary body being retained on the main body so as to be movable in at least one dimension relative to the main body prior to installation of the cover-panel, wherein, the cover-panel is configured to cover at least a portion of each of the main body and the auxiliary body. The assembly comprises a primary datum comprised by one of the cover-panel or the main body, a primary datum retainer comprised by the other of the cover-panel or the main body, wherein the primary datum is configured to engage the at least one primary datum retainer to cause a predetermined alignment of the cover-panel with regard to the main body, a secondary datum comprised by one of the cover-panel or the auxiliary body, a secondary datum receiver comprised by the other of the cover-panel or the auxiliary body, wherein the secondary datum is configured to engage the secondary datum receiver to cause a predetermined alignment of the auxiliary body with regard to both the cover-panel and the main body.

Because the primary datum and receiver may be aligned first, and then the secondary datum and receiver are able to align based on the movable nature of the auxiliary body, it becomes possible to use a single cover panel to cover a large portion of the main and auxiliary bodies.

In addition, because a secondary datum may be positioned close to the auxiliary body, as compared with the main datum, joint tolerances of the assembly can be reduced, and perceivable engineering fit and finish quality of the assembly can be improved.

The auxiliary body may include a retainer configured to cooperate with the cover-panel to render the auxiliary body immovable with regard to the main body following installation of the cover-panel.

The primary datum may include retaining means configured to prevent the primary datum from being removed from the primary datum retainer. The retaining means may include, for example, a snap-fit retainer.

The main body may include a vehicle entertainment and/or information system and the auxiliary body comprises controls for controlling the vehicle entertainment and/or information system. The controls may include at least one of a button and a rotatable knob, and may be configured to extend beyond a plane of the cover panel so as to be accessible to an operator of the vehicle. Joint tolerances between the controls and the corresponding covering portion of the cover panel may be reduced, yielding a higher quality and more aesthetically pleasing appearance.

The secondary datum may include a pin and the secondary datum receiver may include a tapered hole. This may facilitate insertion of the pin into the tapered hole, and may render alignment with the auxiliary body more manageable.

The auxiliary body may be movable in only two dimensions with regard to the main body. This movement may be limited to a range of between, about, 0.5 mm to 2.5 mm.

The auxiliary body may be fixed in the X direction corresponding to a front/rear direction of a vehicle in which the dashboard component assembly is to be installed.

The cover-panel may include the primary datum and the main body comprises the primary datum retainer. The cover-panel may include the secondary datum and the auxiliary body may include the secondary datum receiver.

The main body may include one or more fastening points configured to enable fastening of the main body to the vehicle.

According to further embodiments of the present disclosure, a method for installing a cover-panel on a dashboard component is provided. The method includes assembling an auxiliary body onto a main body of the dashboard component such that the auxiliary body is movable in at least one dimension relative to the main body prior to installation of a cover-panel, inserting a primary datum of the cover-panel into a primary datum retainer of the main body, and causing retaining means of the primary datum to engage with a primary datum retainer of the main body such that a secondary datum of the cover-panel engages with a secondary datum receiver of the auxiliary body to render the auxiliary body substantially immovable.

The method may include generating an audible feedback indicating engagement of the primary datum.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
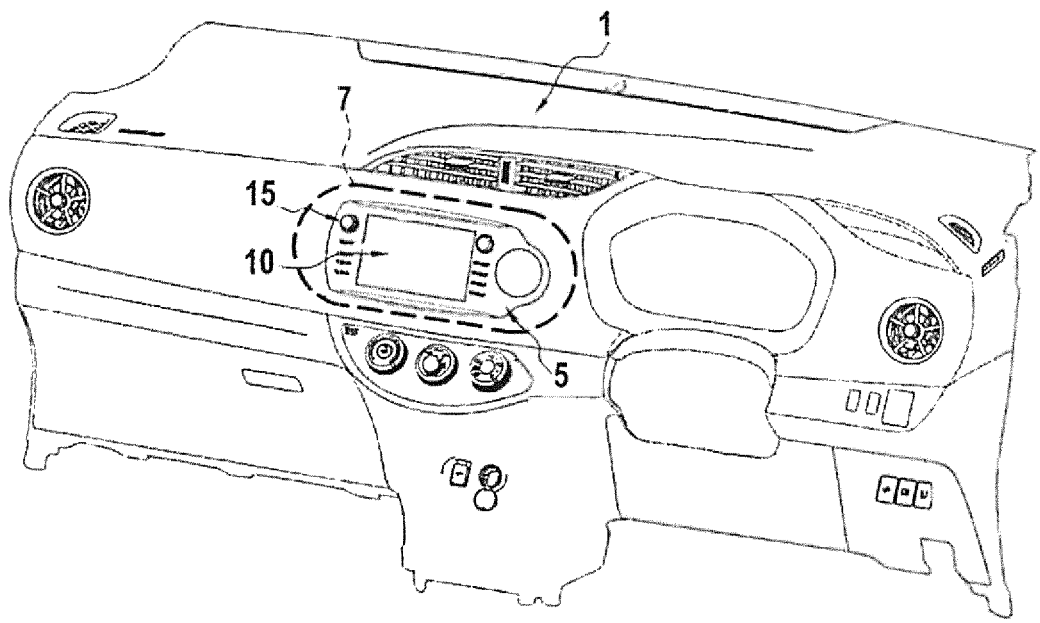
FIG. 1 shows an exemplary dashboard of a vehicle.

FIG. 1 shows an exemplary dashboard 1 of a vehicle (not shown) on which is installed various instruments, controls, and a dashboard assembly 7, among others. Dashboard assembly 7 may include, for example, a main body 10 and an auxiliary body 15, and a cover panel 5. One of skill will recognize that additional components may be present on dashboard 1 without departing from the scope of the present disclosure.

Dashboard assembly 7 may comprise, for example, a vehicle entertainment system, a navigation system, an information system, etc., and/or may be combinations thereof. For example, functions of a vehicle entertainment system and a navigation system may be combined and information displayed on a single output screen depending on selected options.

Figure 2:
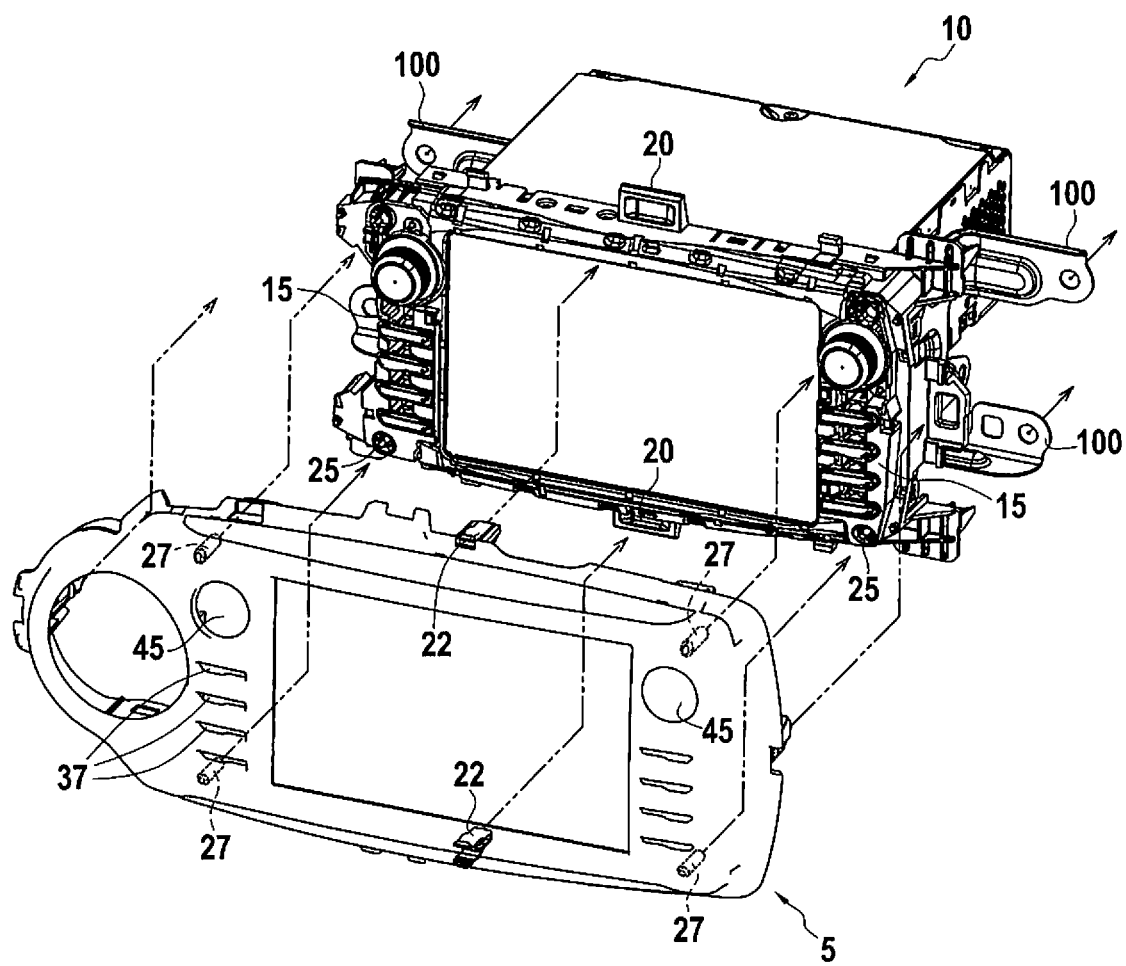
FIG. 2 is an exemplary schematic of a dashboard component assembly in a pre-installation stage.

FIG. 2 is an exemplary schematic of a dashboard component assembly 7 in a pre-installation stage, and showing an exemplary alignment and installation path of a cover panel 5 with regard to an assembled main body 10 and auxiliary body 15.

Cover panel 5 is configured to cover at least a portion of each of main body 10 and auxiliary body 15, for example, to provide finished edges and smooth integration with the dashboard around a periphery of the dashboard assembly 7, and around controls 35, 40 which extend through cover panel 5 to render such controls 35, 40 accessible to an operator of the vehicle.

As shown at FIG. 2, cover panel 5 may comprise various features depending on a desired design aesthetic of a vehicle interior. For example, one or more holes 37, 45 enabling controls (e.g., buttons 35, knobs 40, etc.) present on auxiliary body 15 and/or main body 10 to protrude through cover panel 5 when cover panel 5 is in an installed position on the dashboard assembly 7. For purposes of the present disclosure, an "installed position" shall refer to a position in which a cover panel 5 is securely fastened in place on dashboard assembly 7.

In addition, cover panel 5 may include a void enabling viewing of and access to a screen (e.g., a touch screen) and/or other desired features associated with main body 10.

Cover panel 5 may comprise any suitable material, and may, for example, be fabricated from a molded plastic material (e.g., compression molded, injection molded, overmolded, etc.) as desired. Cover panel 5 may further include a layer of finish material or a "finish layer" such as, for example, leather, paint, clear coat, anti-scratch, etc.

Cover panel 5 may include one or more primary datum 22 and one or more secondary datum 27, and/or, as described below, primary datum retainers 20 and secondary datum receivers 25.

The one or more primary datum 22 may comprise, for example, a protrusion such as a clip (e.g., snap-fit), a pin, a tab, etc., extending from a portion of its respective member (e.g., cover panel 5 or main body 10), which aligns with a corresponding primary datum retainer 20 present on the other of the cover panel 5 or main body 10.

Primary datum 22 may have any shape, for example, a cylindrical shape, a flat shape, etc., and may be unitary with the respective cover panel 5 or main body 10. Alternatively, primary datum 22 may be affixed to the respective cover panel or main body by any suitable method, e.g., overmolding.

Primary datum 22 is configured to engage a primary datum retainer 20 to cause a predetermined alignment of the cover-panel with regard to the main body. Upon such engagement, primary datum may be configured to provide an audible feedback, such as a click, indicating that an installed position has been reached.

Primary datum retainer 20 is configured to engage with primary datum 22, to cause a predetermined alignment of cover panel 5 with regard to the main body 10, and may be configured to fix cover panel 5 in place such that the primary datum 22 is prevented from being removed from the primary datum receiver 20 absent application of a predetermined force. For example, primary datum retainer 20 may comprise a hole and/or recess present on a tab or other suitable portion of either cover panel 5 or main body 10, such that snap fit clips comprising primary datum 22 may be inserted and "clipped" into place. In such an example, where it is desired to remove primary datum 22 from primary datum retainers, a force may be applied to primary datum 22 to result in release from the associated primary datum retainer 20.

Secondary datum 27 may comprise, for example, a protrusion such as a pin, a tab, a cone, a button, etc., extending from a portion of cover panel 5 or main body 10, which aligns with a corresponding a secondary datum receiver 25 present on the other of the cover panel 5 or auxiliary body 15.

Secondary datum 27 may have any shape, for example, a cylindrical shape, a flat shape, spherical shape, etc., and may be unitary with the respective cover panel 5 or auxiliary body 15. Alternatively, secondary datum 27 may be affixed to the respective cover panel or main body by any suitable method, e.g., overmolding.

Secondary datum 27 is configured to engage a secondary datum receiver 25 on either auxiliary body 15 or cover panel 5 to cause a predetermined alignment of the auxiliary body 15 with regard to both the cover panel 5 and the main body 10.

Secondary datum receiver 25 is configured to engage with secondary datum 27, to cause a predetermined alignment of cover panel 5 with regard to the main body 10 and auxiliary body 15. For example, primary datum retainer 20 may comprise a hole and/or recess present on either cover panel 5 or auxiliary body 10, such that a pin comprising primary datum 22 may be inserted and via such insertion, cause movement of auxiliary body 15 in the Y and Z axes so as to bring cover panel 5, auxiliary body 15, and main body 10, into a desired alignment.

To facilitate reception of secondary datum 27, secondary datum receiver 25 may comprise a taper at a receiving portion such that a secondary datum 27 may be guided into secondary datum receiver 25 as cover panel 5 is pressed into place on dashboard assembly 7. For example, as shown at FIG. 4C, secondary datum receiver 25 comprises a hole, the hole having a taper 32 to facilitate insertion of a pin comprising secondary datum 27, e.g., during alignment of cover panel 5, auxiliary body 15, and main body 10. In addition, or alternatively, secondary datum 27 may comprise a taper to facilitate insertion into secondary datum receiver 25, as desired.

Figure 3:
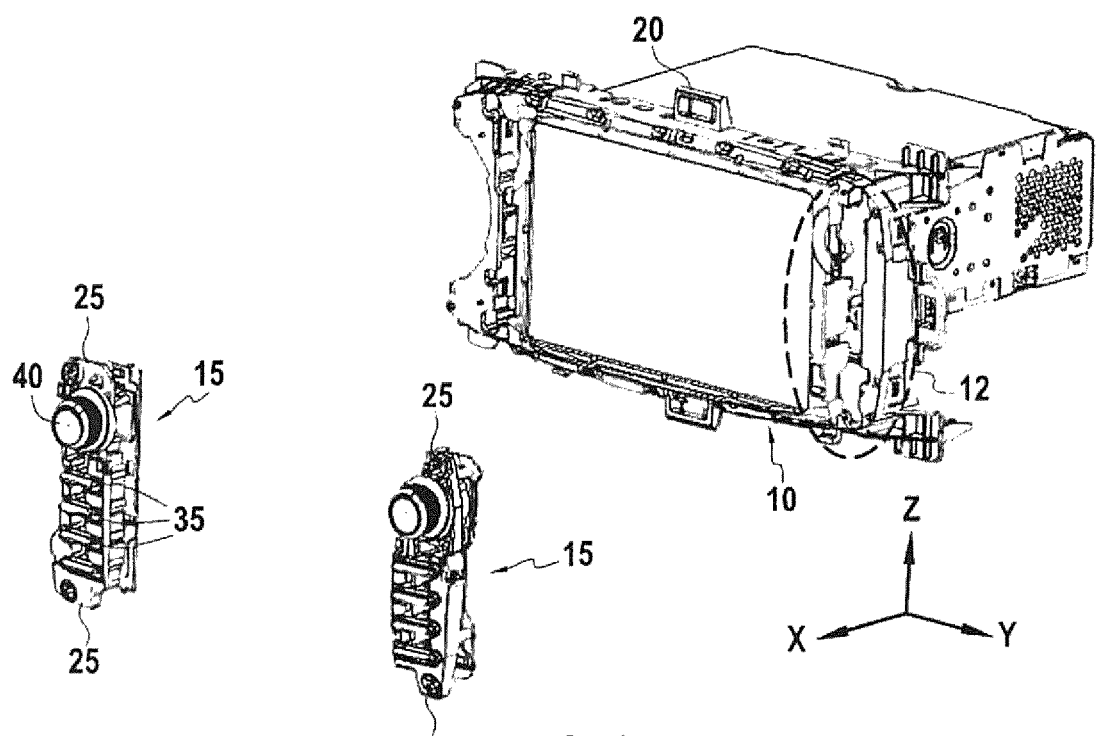
FIG. 3 shows an exemplary main body and auxiliary bodies of a dashboard component according to embodiments of the present disclosure.

FIG. 3 shows an exemplary main body 10 and auxiliary bodies 15 of a dashboard component according to embodiments of the present disclosure in an unassembled state. FIG. 3 further shows axes X, Y, and Z, which shall be used herein. For purposes of the present disclosure, the X axis shall be intended to refer to the axis that is parallel to a longitudinal axis of the vehicle in which the dashboard assembly 7 is installed. In other words, the axis which runs from the front to the back of the vehicle. The Y and Z axes, for purposes of the disclosure, refer to a vertical axis and an axis extending from one side of the vehicle to the other, respectively.

Main body 10 may include one or more interfaces such as, for example, a screen (e.g., a touchscreen), to enable interaction with an operator and/or passenger of the vehicle, as well as various other components, e.g., knobs 40, buttons 35, etc.

Main body 10 may include additional features enabling main body 10 to be secured within the dashboard of the vehicle. For example, main body 10 main include one or more fastening points 100 (shown at FIG. 3) configured to enable fastening of the main body 10 to the vehicle, e.g., via bolts, screws, and/or other suitable means. Such fastening points 100 may comprise, for example, one or more tabs having holes enabling fasteners to pass therethrough and engage one or more points on the vehicle chassis (not shown).

Main body 10 includes one or more retainers 20, configured to engage with primary datum 22 on cover panel 5 to result in alignment and retention of cover panel 5. For example, retainers 20 may comprise, e.g., an orifice and/or recess and may be configured to receive a primary datum 22 (e.g., a protrusion such as a snap-fit clip or pin) present on cover panel 5, such that upon insertion of the primary datum, cover panel 5 may be securely retained on main body 10.

One or more retainers 20 may be present on main body 10, with primary datum 22 present on cover panel 5, or where a plurality of receivers 20 and primary datum 22 are present, possibly distributed between cover panel 5 and main body 10 as desired. According to one embodiment, cover panel 5 comprises primary datum 22 and main body 10 comprises retainers 20.

One or more retainers 20 may be positioned around main body 10 as desired. For example, where main body 10 is essentially a rectangular shape, 4 retainers 20 may be placed around main body 10 at equal intervals such that one retainer 20 is present on each side of main body 10. More or fewer retainers 20 may also be implemented as desired.

One of skill will recognize based on the present disclosure that the number and placement of the one or more retainers 20 may be determined based on a size and design of the dashboard assembly 7, and therefore, any such configuration should fall within the scope of the present disclosure.

In addition, main body 10 may include one or more mounting points 12 for one or more auxiliary bodies 15 associated with main body 10. The mounting points 12 present on main body 10 for auxiliary bodies 15 may include one or more clips, brackets, guides, channels, among others, suitable for maintaining auxiliary bodies 15 in an assembled state on main body 10. The mounting points may be configured to retain auxiliary bodies 15 on the main body such that each auxiliary body 15 is movable in at least one dimension relative to the main body prior to installation of the cover-panel 5.

Upon assembly of an auxiliary body 15 onto main body 10 at mounting point 12, for example, auxiliary body 15 may have freedom of movement relative to main body 10 in the Y and Z axes, but may be substantially immovable in the X axis (e.g., freedom of movement of 0.001 mm). In other words, an auxiliary body 15 in an assembled state on main body 10 may be permitted to move vertically and horizontally side to side, but substantially prevented from moving in a direction from frontwards/backwards with regard to the vehicle longitudinal axis.

The freedom of movement available to auxiliary body 15 in the Y and Z axes when in the assembled state may be limited to a range between, for example, 0.5 mm to 2.5 mm. By reducing or even eliminating motion in the X axis, while allowing a range of motion in the Y and Z axes, installation of cover panel 5 may be facilitated as described in greater detail below.

Figure 4A:
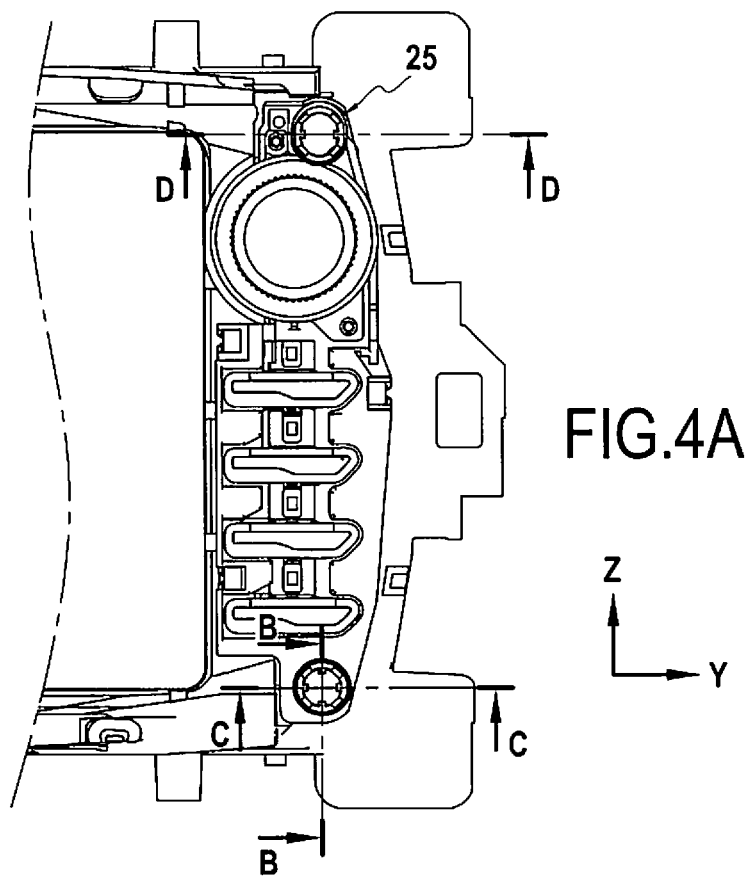
FIG. 4A is a detailed plan view of an exemplary auxiliary body installed on a main body of the dashboard component.
Figure 4B:
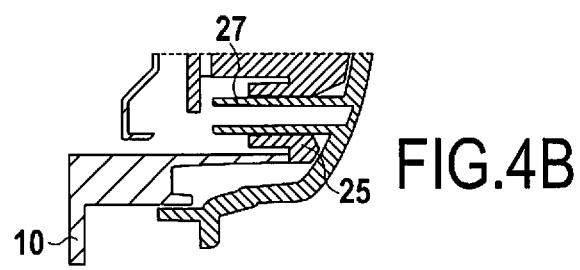
FIG. 4B is a cross-section taken along D-D of FIG. 4A.
Figure 4C:
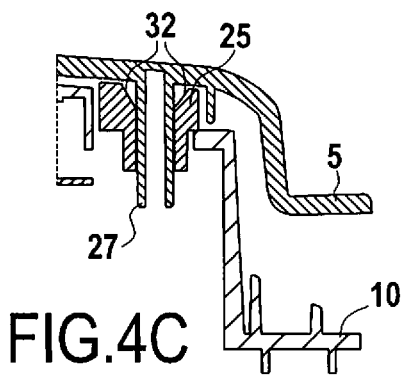
FIG. 4C is a cross-section taken along B-B of FIG. 4A.
Figure 4D:
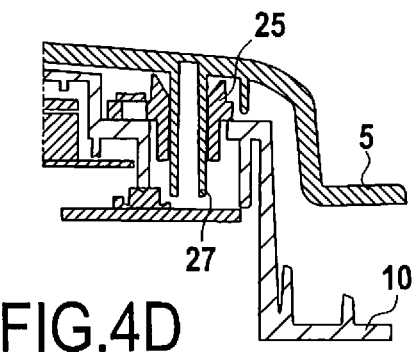
FIG. 4D is a cross-section taken along C-C of FIG. 4A.
Figure 5A:
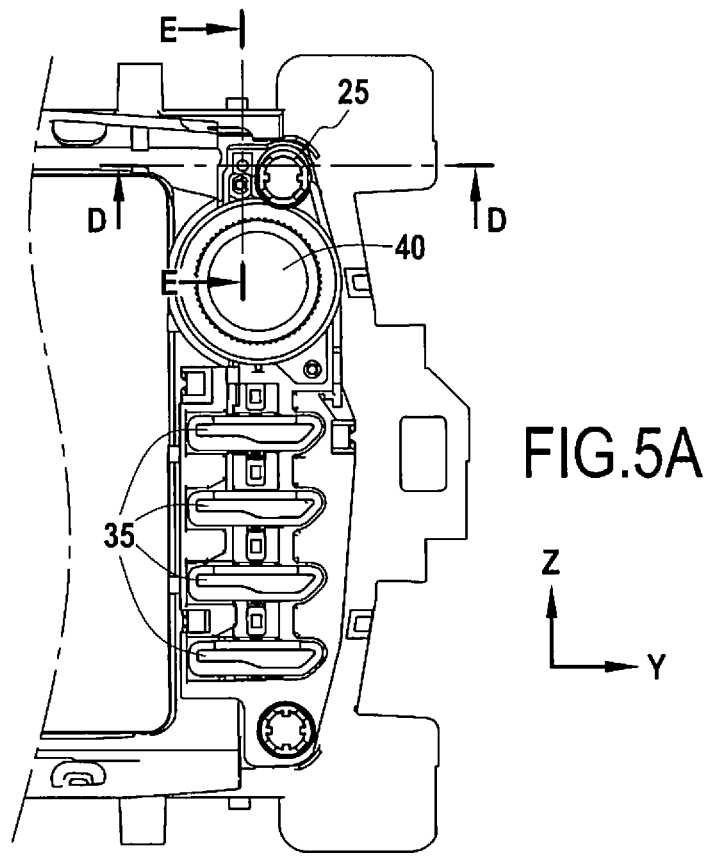
FIG. 5A is a reproduction of FIG. 4A for purposes of highlighting additional cross-sections.
Figure 5B:
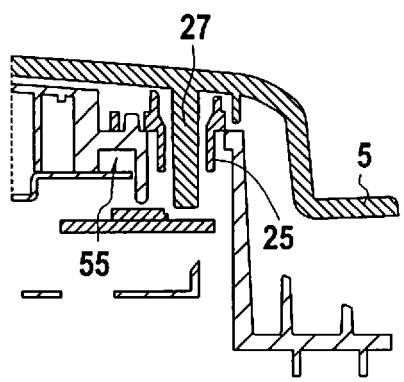
FIG. 5B is a cross-section taken along D-D of FIG. 5A.
Figure 5C:
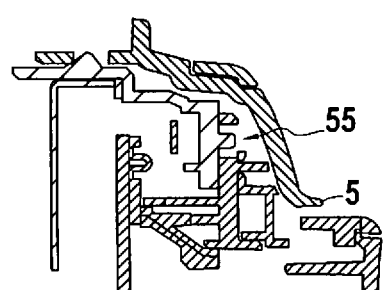
FIG. 5C is a cross-section taken along E-E of FIG. 5A.

FIGS. 4A and 5A are detailed plan views of an exemplary auxiliary body installed on a main body of the dashboard component. FIG. 5C is a cross-section taken along E-E of FIG. 5A and highlights movement restrictors 55 on main body 10, which are configured to limit the motion of auxiliary body 15 when assembled on main body 10. As shown, such movement restrictors may comprise one or more protrusions extending from main body 10 at predetermined positions, to limit the range of motion of auxiliary body 15 in the Y and Z directions. One of skill in the art will understand that other suitable variants of movement restrictors 55 may be implemented without departing from the scope of the present disclosure.

Auxiliary body 15 may comprise, among others, controls for interacting with functions provided by main body 10. For example, where main body 10 comprises a vehicle entertainment system and/or an information system (e.g., a stereo radio, a GPS, etc.), auxiliary body 15 may comprise one or more knobs 40, buttons 35, sliders (not shown), etc. configured to enable manipulation of the entertainment system. One of skill will understand that any number and combination of controls may be present on auxiliary body 15, and that a size and shape of such controls may be selected as desired for a given look and feel.

Importantly, the configurations of main body 10 and auxiliary body 15 discussed herein are intended as exemplary only. Auxiliary body 15 may comprise functionality typically provided for in a larger dashboard assembly. For example, a stereo radio may be present within an auxiliary control 15, while a main body 10 comprises a vehicle information system. In such a configuration, controls provided on auxiliary body 15 may also be used to manipulate the vehicle information system of main body 10, and vice versa.

According to some embodiments, controls 35 and 40 of auxiliary body 15 may be communicatively connected to main body 10, for example, by a ribbon cable, wireless technology, standard cabling, etc., and such a connection may be made prior or post assembly of auxiliary body to main body 10.

Auxiliary body 15 may include one or more engagement portions configured to engage with mounting points 12 on main body 10. For example, where channels are provided for mounting points 12 on main body 10, auxiliary body 15 main include one or more flanged tabs configured to be inserted and retained with the channels. One of skill will recognize that various configurations are possible and intended to fall within the scope of the present disclosure.

Auxiliary body 15 may include one or more receivers 25 configured to receive a secondary datum 27 (e.g., a protrusion such as a pin or clip) to cause a predetermined alignment of the auxiliary body 15 with regard to both cover panel 5 and main body 10.

Receivers 25 may be formed on auxiliary body 15 so as to cooperate to result in the alignment described. Further, receivers 25 may include one or more features, such as, for example, a taper, configured to facilitate insertion of secondary datum 27 therein during assembly of dashboard assembly 7.

Figure 6A:
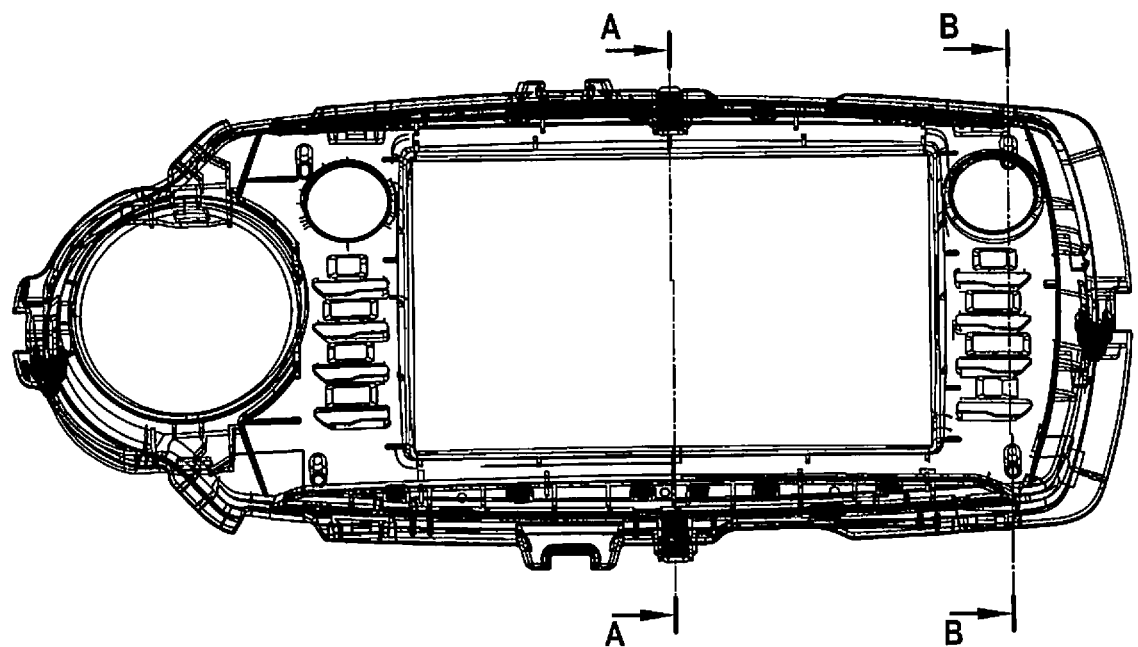
FIG. 6A is a detailed plan view of an exemplary cover panel fully installed on the dashboard component.
Figure 6B:
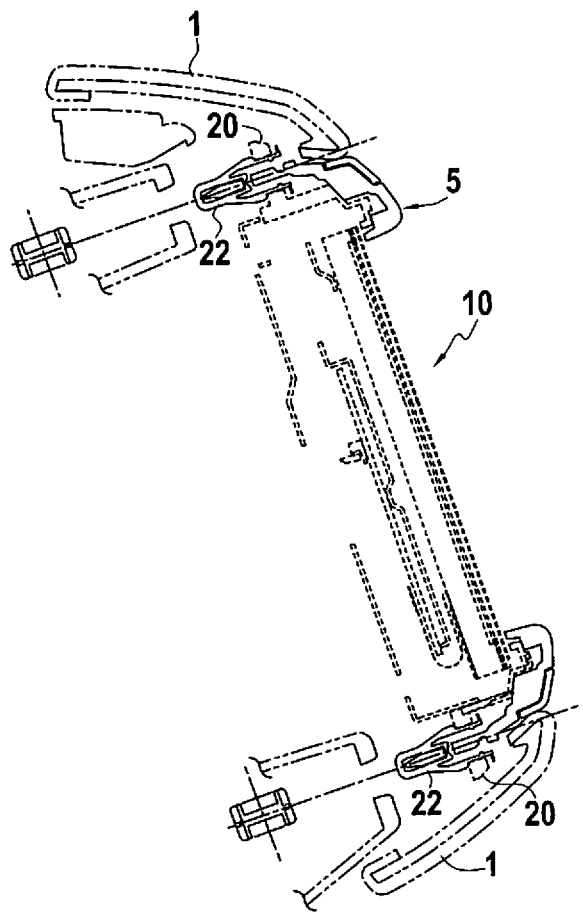
FIG. 6B is a cross-section along A-A of FIG. 6A.
Figure 6C:
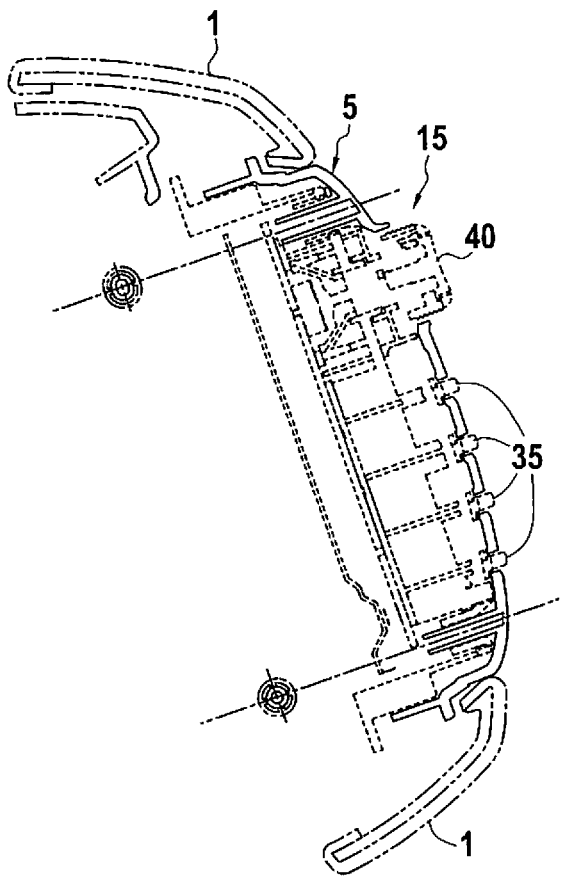
FIG. 6C is a cross-section along B-B of FIG. 6A.

FIG. 6A is a detailed plan view of an exemplary cover panel fully installed on the dashboard component, while FIG. 6B is a cross-section along A-A of FIG. 6A, and FIG. 6C is a cross-section along B-B of FIG. 6A. In these figures, one may view one or more of the features described above following assembly of dashboard assembly 7.

Figure 7:
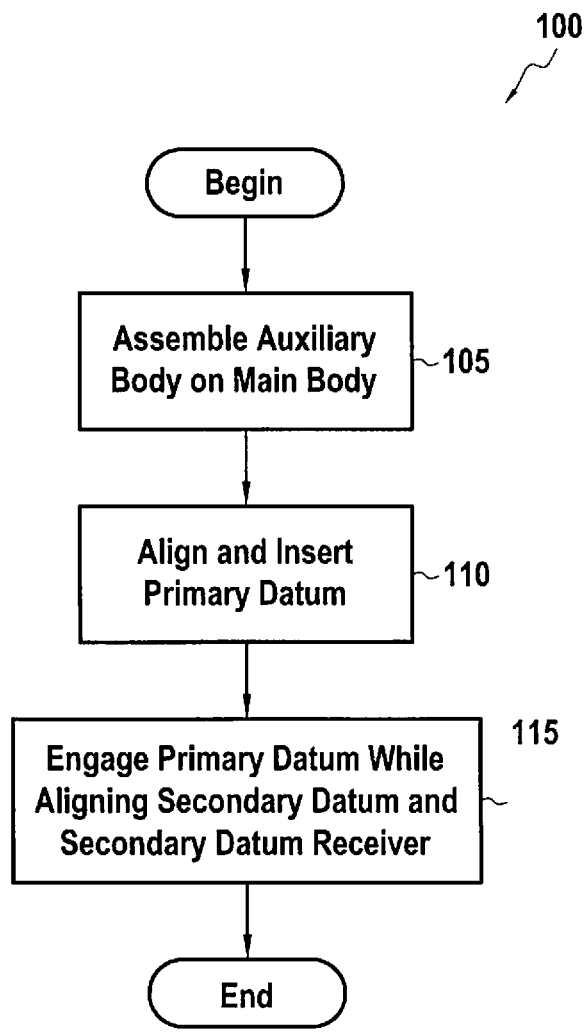
FIG. 7 is a flowchart depicting an exemplary method for assembling a dashboard assembly according to the present disclosure.

FIG. 7 is a flowchart 100 depicting an exemplary method for assembling a dashboard assembly according to the present disclosure. Initially, auxiliary bodies 15 may be assembled on to main body 10 (step 105). For example, portions of auxiliary bodies 15 may be inserted into mounting points 12 of main body 10 to result in retention of auxiliary body 15, and prevention of movement along the X axis.

Cover panel 5 may then be aligned such that primary datum 22 are aligned with retainers 20, and an initial pressing force applied to cover panel 5 to result in at least partial insertion of primary datum 22 into retainers 20 (step 110).

Primary datum 22 may then be engaged with retainers 20 while secondary datum 27 are inserted into secondary datum receivers 25 to cause alignment of cover panel 5, auxiliary body 15, and main body 10, rendering the auxiliary bodies 15 substantially immovable (step 115).

Figure 8A:
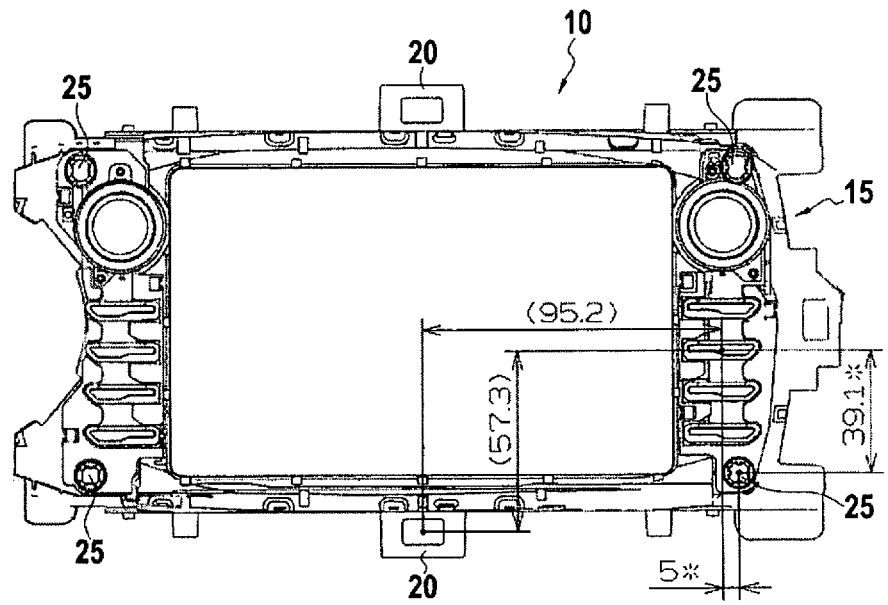
FIG. 8A is a plan view of exemplary main and auxiliary bodies with dimension comparisons.
Figure 8B:
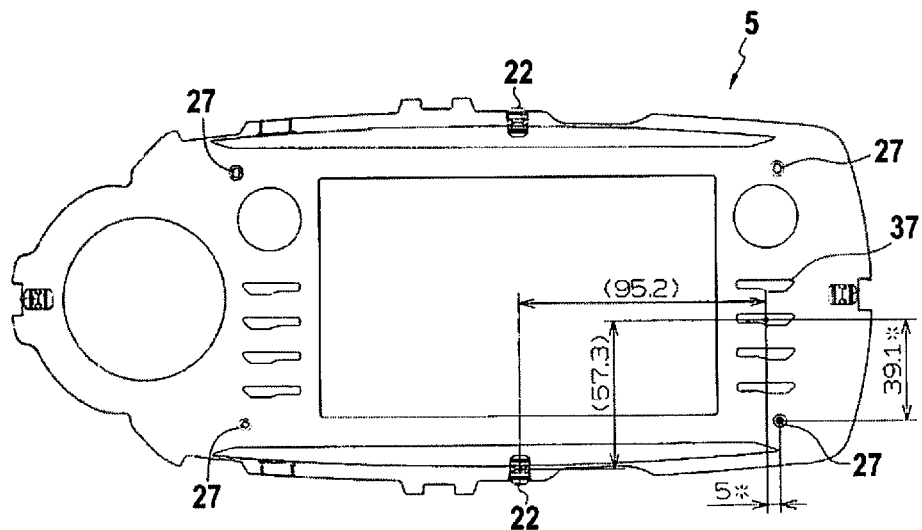
FIG. 8B is a plan view of an exemplary cover panel with dimension comparisons.

FIG. 8A is a plan view of exemplary main 10 and auxiliary bodies 15 with dimension comparisons, and FIG. 8B is a plan view of an exemplary cover panel 5 with dimension comparisons. In previous designs prior to this invention, larger dimensions such as the exemplary dimensions shown in parentheses, may have been used to calculate the joint tolerances for an audio panel button and cover panel button opening to determine a clearance there between. However, based on the present invention, the smaller dimensions (shown with asterisk) are used as the primary datum 22 on the main body 10 function as acting main datum for auxiliary body 15 and openings 37 and 45 on cover panel 5.

One of skill in the art will recognize that additional variations may be provided without departing from the scope of the present disclosure. For example, according to some embodiments, pads (e.g., rubber or other suitable material) may be positioned on auxiliary body 15 so as to correspond with ribs present on cover panel 5. Upon installation of cover panel 5, the ribs and pads may engage one another to result in a pressure exerted on the two parts, thereby reducing possibility of small movements during drive and potential noise production (e.g., squeaks and rattles.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A dashboard component assembly for a vehicle, the dashboard component assembly comprising:
   a cover-panel;
   a main body and an auxiliary body, the auxiliary body being retained on the main body so as to be movable in at least one dimension relative to the main body prior to installation of the cover-panel, a portion of a front surface of the auxiliary body being located adjacent to a portion of a front surface of the main body when the auxiliary body is retained on the main body so that the portion of the front surface of the auxiliary body and the portion of the front surface of the main body can be seen by an operator of the vehicle from within a cabin of the vehicle;

a primary engagement member comprised by one of the cover-panel or the main body;

a primary engagement member retainer comprised by the other of the cover-panel or the main body, wherein the primary engagement member is configured to engage the primary engagement member retainer to cause a predetermined alignment of the cover-panel with regard to the main body;

a secondary engagement member comprised by one of the cover-panel or the auxiliary body; and a secondary engagement member receiver comprised by the other of the cover-panel or the auxiliary body, wherein the secondary engagement member is configured to engage the secondary engagement member receiver to cause a predetermined alignment of the auxiliary body with regard to both the cover-panel and the main body, wherein the cover-panel is configured to cover at least a portion of each of the main body and the auxiliary body, and at least the portions of the front surfaces of each of the main body and the auxiliary body can be seen and accessed through the cover-panel by the operator of the vehicle when the cover-panel is in an installed position.

2. The dashboard assembly according to claim 1, wherein the auxiliary body comprises a retainer configured to cooperate with the cover-panel to render the auxiliary body immovable with regard to the main body following installation of the cover-panel.

3. The dashboard component assembly according to claim 1, wherein the primary engagement member comprises a retaining mechanism configured to prevent the primary engagement member from being removed from the primary engagement member retainer.

4. The dashboard component assembly according to claim 3, wherein the retaining mechanism comprises a snap-fit retainer.

5. The dashboard component assembly according to claim 1, wherein the main body comprises at least one of a vehicle entertainment system and an information system and the auxiliary body comprises controls for controlling the at least one of the vehicle entertainment system and the information system.

6. The dashboard component assembly according to claim 5, wherein the controls comprise at least one of a button and a rotatable knob.

7. The dashboard component assembly according to claim 5, wherein the controls are configured to extend beyond a plane of the cover-panel so as to be accessible to the operator of the vehicle.

8. The dashboard component assembly according to claim 1, wherein the secondary engagement member comprises a pin and the secondary engagement member receiver comprises a tapered hole.

9. The dashboard component assembly according to claim 1, wherein the auxiliary body is movable in two dimensions with regard to the main body.

10. The dashboard component assembly according to claim 9, wherein the auxiliary body is prevented from moving in a direction toward at least one of a front and a rear of a vehicle in which the dashboard component assembly is to be installed.

11. The dashboard component assembly according to claim 1, wherein the cover-panel comprises the primary engagement member and the main body comprises the primary engagement member retainer.

12. The dashboard component assembly according to claim 1, wherein the cover-panel comprises the secondary engagement member and the auxiliary body comprises the secondary engagement member receiver.

13. The dashboard component assembly according to claim 1, wherein the main body comprises one or more fastening points configured to enable fastening of the main body to the vehicle.

14. The dashboard component assembly according to claim 1, wherein the cover-panel includes one or more openings so that at least the portions of the front surfaces of each of the main body and the auxiliary body can be seen and accessed through the cover-panel by the operator of the vehicle when the cover-panel is in the installed position.

15. The dashboard component assembly according to claim 14, wherein the auxiliary body includes one or more controls configured to extend through the one or more openings of the cover-panel.

16. The dashboard component assembly according to claim 14, wherein the main body includes a display configured to be visible through the one or more openings of the cover-panel.

17. A method for installing a cover-panel on a dashboard component of a vehicle, the method comprising:

assembling an auxiliary body onto a main body of the dashboard component so that the auxiliary body is movable in at least one dimension relative to the main body prior to installation of the cover-panel, a portion of a front surface of the auxiliary body being located adjacent to a portion of a front surface of the main body when the auxiliary body is assembled to the main body so that the portion of the front surface of the auxiliary body and the portion of the front surface of the main body can be seen by an operator of the vehicle from within a cabin of the vehicle;

inserting a primary engagement member of the cover-panel into a primary engagement member retainer of the main body; and causing a retaining mechanism of the primary engagement member to engage with the primary engagement member retainer of the main body to cause a predetermined alignment of the cover-panel with regard to the main body and so that a secondary engagement member of the cover-panel engages with a secondary engagement member receiver of the auxiliary body to render the auxiliary body substantially immovable relative to the cover-panel and the main body, wherein;

at least the portions of the front surfaces of each of the main body and the auxiliary body can be seen and accessed through the cover-panel by the operator of the vehicle when the cover-panel is in an installed position.

18. The method according to claim 17, further comprising generating an audible feedback indicating engagement of the primary engagement member.

19. The method according to claim 17, further comprising defining one or more openings in the cover-panel so that at least the portions of the front surfaces of each of the main body and the auxiliary body can be seen and accessed through the cover-panel by the operator of the vehicle when the cover-panel is in the installed position.

* * * * *